Dec. 12, 1961     M. A. DAMAST     3,013,256
ELECTRONIC APPARATUS FOR SENSING THE PRESENCE
OR ABSENCE OF MATERIAL
Filed May 1, 1957

INVENTOR.
MARTIN A. DAMAST
BY
James and Franklin
ATTORNEYS.

United States Patent Office 3,013,256
Patented Dec. 12, 1961

3,013,256
ELECTRONIC APPARATUS FOR SENSING THE PRESENCE OR ABSENCE OF MATERIAL
Martin A. Damast, West Islip, N.Y., assignor to Acoustica Associates, Inc., Glenwood Landing, N.Y., a corporation of New York
Filed May 1, 1957, Ser. No. 656,293
9 Claims. (Cl. 340—244)

This invention relates to electronic apparatus, and more particularly to such apparatus for sensing the presence or absence of material.

In a copending application of Robert L. Rod, Serial No. 585,889 filed May 18, 1956 and entitled "Sensing the Presence or Absence of Material," there is disclosed apparatus in which an electro acoustic transducer acts as the sensing element, and acts differently when immersed or not immersed in the material (usually but not necessarily a liquid). One form of the Rod invention utilizes the change in impedance or damping of the transducer when immersed.

The primary object of the present invention is to generally improve such a system. A more particular object is to provide improved circuitry for use in such a system. Another object is to provide an electronic circuit which is sensitive to a change in impedance of an element therein. Still another object is to provide circuitry for use with a high Q transducer assembly of the type described and claimed in a copending application of Morris Kenney Serial No. 656,872 filed May 1, 1957 and entitled "Transducer Assembly." The said transducer assembly is characterized by increased change of impedance between the immersed and non-immersed conditions.

Still another object is to provide such a circuit which employs transistors rather than vacuum tubes, and which preferably is simplified and miniaturized to require only a single transistor.

Figure 1:
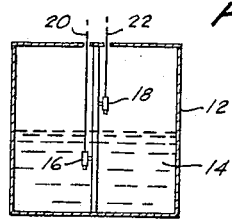
Figure 2:
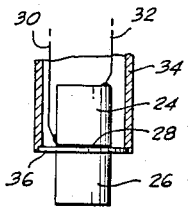
Figure 3:
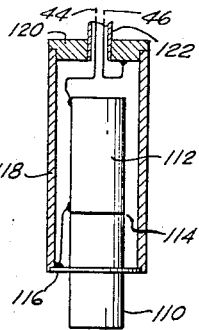
Figure 4:
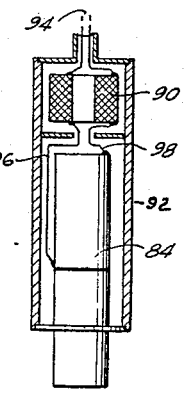
Figure 6:
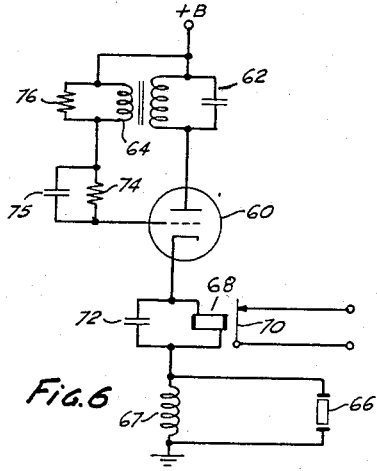
Figure 5:
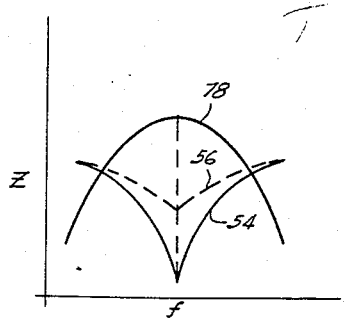
Figure 8:
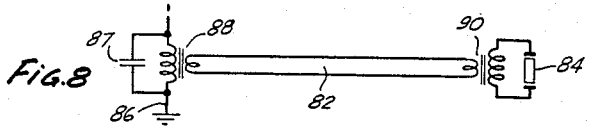
Figure 9:
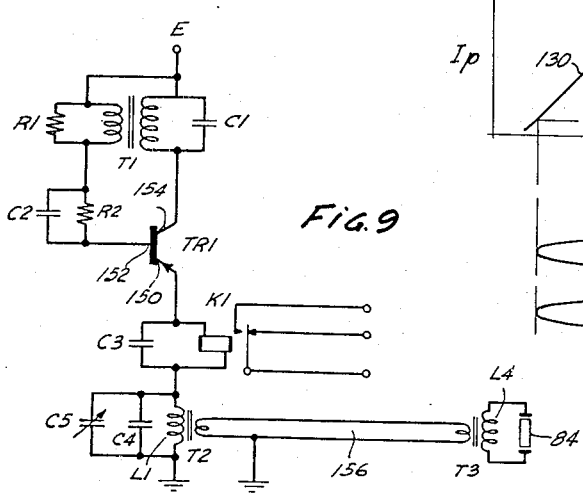
Figure 7:
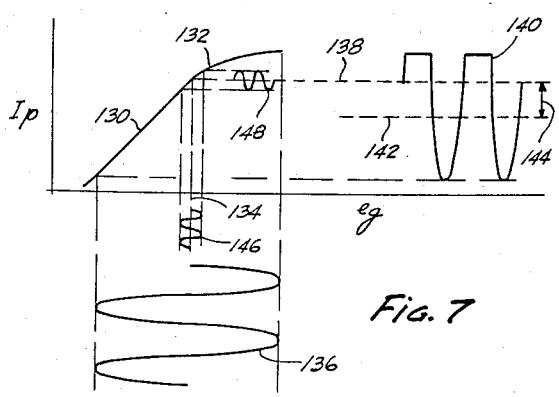

To accomplish the foregoing general objects, and other more specific objects which will hereinafter appear, my invention resides in the electronic circuit elements, and their relation one to another, as are hereinafter more particularly described in the following specification. The specification is accompanied by drawings in which:

FIG. 1 shows one possible use of the apparatus;
FIG. 2 schematically shows one form of high Q electro acoustic sensor;
FIG. 3 shows another sensor;
FIG. 4 shows still another sensor, including an impedance matching transformer;
FIG. 5 shows some resonance curves explanatory of the operation of the invention;
FIG. 6 is a wiring diagram of one form of electronic circuit embodying features of my invention;
FIG. 7 is a graph explanatory of one feature of the circuit;
FIG. 8 is a modification of FIG. 6; and
FIG. 9 is a wiring diagram of a preferred form of the invention utilizing a single transistor.

Referring to the drawing, and more particularly to FIG. 1, a tank 12 contains a material, more specifically a liquid 14. One or more liquid level sensors may be mounted in the tank, as is indicated at 16 and 18. Each is sensitive to the presence or absence of liquid, and thus by means of cables 20 and 22 leading to suitable indicators or/and relays for control purposes, the level of liquid in the tank may be made known or utilized. For example, with multiple fuel tanks, the lowering of liquid in a first tank to a point near the bottom may be used to automatically switch the fuel line to a second tank.

Referring now to FIG. 2 of the drawing, I there show a transducer assembly 24, 26, which has a length of one half wave length. The assembly is made of an inner portion 24 and an outer portion 26 secured end-to-end at 28. In the particular form here shown, the parts 24 and 26 are cylindrical slugs, the circular end faces of which are secured together, as by means of a suitable cement. The parts are each approximately half the length of the assembly, and more specifically, each part is acoustically one-quarter of a wave length long.

The outer portion 26 is made of a low loss or high Q material, specifically a metal such as stainless steel or hard aluminum. The inner portion 24 is a transducer element such as a piezo electric crystal, or a magnetostrictive transducer element. It is preferably a piezo ceramic such as barium titanate. Conductors 30 and 32 lead to electrodes at the ends of the piezo electric crystal or coil terminals of a magnetostrictive element.

The transducer assembly 24, 26 is carried in a cylindrical housing schematically suggested at 34. The lower end 36 of this housing is connected to the transducer assembly at the junction of the parts 24 and 26. In other words, the outer portion 26 of the assembly projects beyond the end 36 of the housing, and the projection is a quarter wave length, in consequence of which the connection is at a node or point of no vibration.

Referring now to FIG. 3 of the drawing, in this case, the transducer assembly 110, 112 has an overall length of one wave length. The metal slug 110 and the transducer element or piezo element 112 are each one-half wave length long. They are secured end-to-end at 114, and conductors 44 and 46 lead to the electrodes at the ends of the ceramic element 112. The housing 118 has an end 116 located at the nodal point which is one-quarter wave length from the free end or sensing surface 52 of the slug. End 116 may be integral with slug 110, and soldered to cylinder 118, or housing 118, end 116, and slug 110 may be fabricated as an integral unit.

Described more generally, I may state that the transducer assembly has an acoustic length of one or more half wave lengths; that the outer and inner portions each has an acoustic length of one or more quarter wave lengths, and the outer end of the assembly projects beyond or is connected to the housing an odd number of quarter wave lengths from the free end of the outer portion, so that the housing and the assembly are connected at a point of no vibration. The inner and outer portions may differ some in physical length in order to be equal in acoustic length.

They need not be equal at all. For example, if the assembly is three half waves long the outer portion could be one and the inner portion two half waves long.

The electrodes may be silver plated at the ends of the ceramic element, and the leads extend to the silver plating. The ceramic is more lossy than the metal slug, and therefore has a relatively lower Q. The metal slug is characterized by good acoustic transmission, that is, it has very little acoustic loss, and therefore has a high Q. Thus, the assembly, consisting of the metal slug and ceramic element, experiences a much larger change in impedance when loaded or immersed in the liquid to be sensed.

When the metal and ceramic slugs are secured together as here described, they both vibrate and function as a single transducer element, even though the source of vibration is the ceramic portion of the element. Thus, in FIG. 2, the transducer has maximum vibration at the ends and a nodal point at the middle. In FIG. 3, there is maximum vibration at the ends and the center, with two nodal points therebetween.

The transducer element functions electrically like a series resonance circuit with some resistance in series. It thus has a resonance curve somewhat as illustrated at 54 in FIG. 5, with an impedance minimum at the series resonance frequency. (There is also a remote peak, not shown, corresponding to parallel resonance, not here involved.) When rising liquid reaches the lower or sensing face of the transducer element, it loads the element against vibration, and flattens the resonance curve somewhat as shown at 56. Thus, there is a change in impedance, and the ratio of the two impedances is a measure of the sensitivity of the sensor for the present purpose.

One improved circuit which may be used for response to the change in impedance is illustrated in FIG. 6. This is shown using a vacuum tube 60. which forms part of an oscillator circuit having a main tuned circuit 62 in series with the plate of the tube. Regenerative feed back is provided by a coil 64 connected to the grid of the tube. The transducer 66 is in series with the cathode of the tube. In general, the oscillator is so adjusted that it stops oscillating when there is a high impedance at 66, and goes into oscillation when there is a low impedance at 66. The presence or absence of oscillation may be used as an indication, or may be used for purposes of control, or both.

In the present case, the oscillator is operated at or near the bend of the characteristic curve of the tube, that is, near saturation. In consequence, the D.C. current flowing in the anode circuit when there is zero or low amplitude oscillation has one value which may be rather high. However, when oscillation is sustained, the tops of the output waves are cut off, and the average or D.C. current is depressed. This difference in D.C. current may be used to operate any desired electrical device, for signal or warning or control purpose. I here show a relay, the magnet 68 of which is connected in the cathode circuit as shown. This controls a movable contact 70 to open or close the relay circuit (or by using two contacts, to close either of two relay circuits). Magnet 68 is preferably bypassed by a bypass capacitor 72. Inductor 67 provides a D.C. path for the cathode circuit, and is preferably selected or adjusted to resonate any shunt capacitance that may be inherent to the transducer assembly.

The saturation or limiting action of the oscillator is illustrated in FIG. 7, in which it is assumed that the tube has a characteristic curve 130 with a bend or knee at 132. The input or grid voltage, with no oscillation, is indicated by the vertical line 134; and when oscillating is indicated by the wave 136. The plate current when not oscillating is indicated by the horizontal line 138, and when oscillating, by the wave 140. It will be noted that the upper half cycles have been cut off or suppressed, so that the output wave is highly asymmetrical compared to the input wave. The average or D.C. plate current is depressed from the level of line 138 to a new lower line 142, with a difference in curret indicated by the arrow 144. The small amplitude waves 146 and 148 have been included to help show the effect of saturation or limiting in the oscillator. With a small amplitude voltage wave 146 on the grid, the plate current reasonably closely reproduces the wave form as shown at 148, but such is not true with the high amplitude wave. Thus the change from line 138 to 142 would be obtained by a wide difference in amplitude of oscillation.

The D.C. operating point of the oscillator is determined by a resistor 74 and capacitor 75 (FIG. 6) combined with the resistance of magnet 68. Capacitor 75 may also be used to vary the response time of the circuit. If desired, a resistor 76 may be added which functions as a damping resistor to broaden the resonance curve of the oscillator. Thus, reverting to FIG. 5, the resonance curve 78 of the oscillator is selected to approximately match the resonance frequency of the transducer, but broadly rather than sharply. The oscillating frequency is determined by the series resonance of the transducer, since this is the point at which the degenerative effect of the transducer is a minimum, and the loop gain of the circuit is a maximum.

If the transducer 66 is to be located remotely from the circuit, as is often the case, it is preferable to provide for impedance transformation at each end of the line in order to minimize capacity effects of the line. Thus, referring to FIG. 8, the line 82 may be a coaxial cable used as a shielded conductor, and may have a length up to say 100 feet. Impedance matching transformers are employed at the transducer 84 and at the cathode circuit 86 of the oscillator. These transformers are indicated at 88 and 90. A capacitor 87 may be provided to tune transformer 88 at the resonance frequency of the transducer 84.

The transformer 90 is preferably housed in the housing of the transducer, and such an arrangement is shown in FIG. 4 which corresponds generally to the transducer of FIG. 3, except for the addition of an impedance matching transformer 90 located in housing 92, the latter being made long enough for the purpose. Thus, the conductors 94 lead downward to one winding of the transformer, while conductors 96, 98 lead from the other winding of the transformer down to the electrodes of the ceramic element 84.

In FIG. 9 I show my invention in a preferred form, using only a single transistor, shown at TR1. The circuit has been arranged much as in FIG. 6 to show the similarity. Here again, the control unit responds to the equivalent electrical input impedance of an ultrasonic transducer 84 which is dependent upon the acoustic loading of the transducer. As the transducer senses a liquid level passing its sensitive face, the acoustic loading and the equivalent electrical input impedance changes, and the control unit operates a switch to perform a control or indication function. The control unit consists of a highly non-linear, transistor-oscillator circuit, and a relay switch, both shown schematically in FIG. 9.

The transistor (TRI) has an emitter 150, a base 152, and a collector 154. The collector-lead winding inductane of transformer TI is resonated by capacitor CI at the operating frequency. The other winding of transformer TI provides a regenerative feedback signal to the base of transistor TRI. The equivalent electrical impedance of the ultrasonic transducer 84 is introduced in series with the emitter lead of transistor TRI through a transformer T2, and provides a degenerative effect in the oscillator circuit which, when the impedance is low, allows oscillations to be sustained, and when it is high, causes oscillations to stop. The sharply-resonant transducer impedance also controls the frequency of oscillation.

A relay coil (KI) is placed in series with the emitter lead of transistor TRI. The latter is operated so that an emitter-current difference, sufficient to operate the relay, exists between the oscillating and non-oscillating conditions of the circuit.

The D.C. operating point of the transistor is established in or near a non-linear region of operation, that is, close to collector current saturation. When the circuit is non-oscillating the emitter current is sufficient to operate the relay KI. The D.C. operating point of transistor TRI is established by resistors R1 and R2, which determine the base current of transistor TRI, and the coil resistance of relay KI, which determines the collector current for a particular value of base current. The coil resistance of relay KI, due to its connection in series with the emitter, also provides a high degree of stabilization to the D.C. operation point.

Oscillations are present in the circuit when the transformed resonant impedance of the transducer is low. The frequency of oscillation occurs approximately at the resonant frequency of the transducer when the degenerative impedance is low and the loop gain of the circuit is a maximum. Resistor R1 provides damping so that the resonance of the collector tuned circuit is broad, compared to the frequency-controlling resonance of the transducer 84. In addition, resistor R1 lowers the driving impedance relative to the base input impedance and thereby stabilizes the oscillating circuit against variation in the characteristics of transistor TR1 and the transducer 84. Capacitor C2 by-passes resistor R2, and capacitor C3 by-passes the coil resistance of relay K1 for the frequency of oscillation. Capacitor C2 may also be used to control the time required for oscillations to build up, or the response time of the device.

The transducer 84 is connected to the control unit through a low impedance line 156. The low impedance of the line is transformed by transformer T2 and introduced in series with the emitter at the proper impedance level. By the use of a low impedance connecting line, the effect of line capacity variation is made negligible. The inductance of the transformer winding is resonated by the transducer and cable capacity and by capacitors C4 and C5 in order to maximize the total impedance change caused by the transducer. Capacitor C5 is adjustable to compensate for unit-to-unit transducer variations.

The particular circuit shown in FIG. 8 is designed to operate at a frequency of approximately 90 KC. One example of the quantitative values used in this circuit is given, but this is solely by way of exemplification, and is not in limitation of the invention. The transistor is an RCA transistor type 2N104. The transformer T1 has a turns ratio of 1 to 5. The capacitor C1 has a value of 300 mmf. The particular transistor mentioned is of the pnp type, and the voltage applied at terminal E may be from minus 24 to minus 28 volts. The capacitor C2 is 0.01 mf. The by-pass capacitor C3 shunting the relay magnet is 0.25 mf. The capacitors C4 and C5 combined have a value of about 750 mmf., or whatever is needed for resonance at the transducer frequency (series resonance).

The resistor R1 has a value of 2.2K. The resistor R2 has a value of 82K. The transformer T2 has a ratio of 10 to 1, and an inductance at L1 of about 5 mh. The transformer T3 has a turns ratio of 1 to 20, and an inductance at L4 of about 25 mh. The relay K1 is a 5000 ohm relay.

The resistor R1 loads the oscillator for added stability, and to broaden its resonance curve. The resistor R2 is for base current biasing. The cable 156 is preferably a coaxial cable, the length of which is not at all critical, and may vary from zero to 100 feet long. The outer conductor of the cable acts also as a shield.

The transducer shown in FIGS. 2, 3 and 4 of the drawing is not claimed herein, it being more fully disclosed and claimed in the copending application of Morris Kenny, Serial No. 656,372 mentioned above.

It is believed that the construction and operation of my improved electronic apparatus for sensing the presence or absence of material, as well as the advantages thereof, will be apparent from the foregoing detailed description. It will also be apparent that while I have shown and described my invention in several forms, changes may be made in the apparatus and circuitry shown without departing from the scope of the invention, as sought to be defined in the following claims. In the following claims, the contrast of impedance between immersion and non-immersion of the transducer is not intended to exclude a liquid level above or below a transducer affixed to the outside of a container wall, to load the transducer when the level is above, as disclosed in the copending application of Robert L. Rod, Serial No. 585,889 mentioned above, for it is the sensing of liquid by loading the transducer that is significant in the claim. The reference to a relay in the D.C. supply circuit of the oscillator is not intended to exclude an indicator which is sensitive and therefore adapted to be connected directly in the D.C. supply circuit without the interposition of a relay.

I claim:

1. An electronic apparatus for sensing the level of liquid material, comprising an electromechanical transducer disposed for immersion at the level to be sensed, and the magnitude of the mechanical vibration impedance of which has a first value when the transducer is not in contact with said material and a second substantially different value when the transducer is in contact with said material, a nonlinear oscillator, means effectively connecting said transducer in the D.C. supply circuit of said oscillator, and means biasing said oscillator to an operating condition, near saturation and therefore the nonlinear portion of its output current vs. control voltage characteristic, in which the electrical series impedance magnitude of said transducer corresponding to said first mechanical vibration impedance value causes oscillation at an amplitude which makes substantial excursions into the current saturation region of said oscillator, and in which the electrical series impedance magnitude of said transducer corresponding to said second mechanical vibration impedance value restrains the amplitude of oscillation of said oscillator to a lower maximum amplitude in which excursions into said saturation region do not occur, said oscillations into the current saturation region being clipped on positive-going half cycles so that the average D.C. current through said oscillator is less during oscillation at said first-named amplitude than during oscillation at said second-named lower amplitude, and relay means operated by the change in said average D.C. current due to the change in amplitude of oscillation from one of said amplitudes to the other.

2. An electronic liquid level sensing apparatus, comprising an electromechanical transducer adapted to vibrate mechanically at a given frequency, an electronic oscillator, a unidirectional current supply for said oscillator, a current responsive device and said transducer connected in a circuit in series with said oscillator across said supply, said oscillator being tuned to oscillate substantially at said frequency, said oscillator having a nonlinear D.C. current vs. voltage characteristic and being biased for D.C. operation in the close vicinity of current saturation, and therefore near the nonlinear portion of its current versus voltage characteristic, said transducer being so located in said series circuit that its series electrical impedance during resonant vibration opposes oscillation of said oscillator and being characterized by a substantial change in the magnitude of said electrical impedance from a first value when said vibration is damped only by a gas to a second value when said vibration is damped by a liquid, said first impedance value conditioning said oscillator to oscillate at a first amplitude level making substantial excursions into the current saturation region where oscillations are clipped on positive-going half cycles so that the average D.C. current passed by said oscillator has a first value, said second impedance value conditioning said oscillator to oscillate at a second lower amplitude level making substantially no excursion into the current saturation region, so that the average D.C. current passed by said oscillator has a second value which is substantially higher than said first average D.C. current value, said current responsive device being adapted to assume a first condition in response to D.C. current of said first value and a second different condition in response to D.C. current of said second value.

3. An electronic apparatus for sensing the level of liquid material, comprising an electromechanical transducer disposed for immersion at the level to be sensed, and the magnitude of the mechanical vibration impedance of which has a first value when the transducer is not in contact with said material and a second substantially different value when the transducer is in contact with said material, said transducer having a relatively sharply resonant series electrical impedance characteristic, a regenerative oscillator having a resonance characteristic which is relatively broader than said transducer characteristic and which is centered substantially at the frequency of resonance of said transducer, means effectively connecting said transducer in the D.C. supply circuit of said oscillator, and means biasing said oscillator to an operating condition, near saturation and therefore the nonlinear portion of its output current vs. control voltage characteristic, in which the electrical impedance magnitude of said transducer corresponding to said first mechanical vibration impedance value causes sustained oscillation of said oscillator at a first amplitude magnitude which makes substantial excursions into the current saturation region of said oscillator, and in which the electrical impedance magnitude of said transducer corresponding to said second mechanical vibration impedance value restrains the amplitude of oscillation of said oscillator to a lower maximum amplitude in which excursions into said saturation region do not occur, said oscillations into the current saturation region being clipped on positive-going half cycles so that the average D.C. current through said oscillator is less during oscillation at said first-named amplitude than during oscillation at said second-named lower amplitude, and relay means operated by the change in said average D.C. current due to the change in amplitude of oscillation from one of said amplitudes to the other.

4. An electronic apparatus for sensing the level of liquid material, comprising an electromechanical transducer disposed for immersion at the level to be sensed, and the magnitude of the mechanical vibration impedance of which has a first value when the transducer is not in contact with said material and a second substantially different value when the transducer is in contact with said material, a regenerative electronic oscillator and a D.C. supply therefor, said oscillator including an electronic valve device having two principal electrodes and in series therewith across said D.C. supply an antiresonant circuit tuned substantially to the fundamental frequency of mechanical resonance of said transducer, said transducer being coupled effectively in series with said valve device and said antiresonant circuit across said D.C. supply in a series circuit position such that an increase in the electrical series impedance of said transducer biases said valve device toward cut-off from a conductive condition, and means biasing said oscillator to an operating condition, near saturation and therefore the nonlinear portion of its output current vs. control voltage characteristic, in which the electrical series impedance magnitude of said transducer corresponding to said first mechanical vibration impedance value causes oscillation of said oscillator at an amplitude which makes substantial excursions into the current saturation region of said oscillator, and in which the electrical series impedance magnitude of said transducer corresponding to said second mechanical vibration impedance magnitude restrains the amplitude of oscillation of said oscillator to a lower maximum amplitude in which excursions into said saturation region do not occur, said oscillations into the current saturation region being clipped on positive-going half cycles so that the average D.C. current through said oscillator is less during oscillation at said first-named amplitude than during oscillation at said second-named lower amplitude, and relay means operated by the change in said average D.C. current due to the change in amplitude of oscillation from one of said amplitudes to the other.

5. Apparatus according to claim 4 in which said valve device is an electron tube having at least an anode and a cathode, said antiresonant circuit is connected between said anode and the positive side of said D.C. supply, and said transducer is coupled effectively between said cathode and the negative side of said D.C. supply.

6. Apparatus according to claim 4 in which said valve device is a transistor having at least an emitter electrode and a collector electrode and is connected via said electrodes in said series circuit.

7. An impedance sensitive apparatus comprising an electronic regenerative oscillator, a D.C. supply therefor, a variable impedance device in the form of an electro mechanical transducer the magnitude of whose electrical impedance varies between a first magnitude and a second lower magnitude according to its mechanical loading during mechanical vibration said device having said electrical impedance coupled effectively in series with said oscillator and D.C. supply, said oscillator being tuned to oscillate at the mechanical resonance frequency of said transducer, and means biasing said oscillator to a D.C. operating level below but close to saturation, and therefore the nonlinear portion of its output current vs. control voltage characteristic, which assures oscillation excursions substantially beyond saturation when said impedance has said second magnitude and oscillation entirely at a level below saturation when said impedance has said first magnitude, said oscillations into the saturation region being clipped on positive-going half cycles so that the average D.C. current passed by said oscillator is less during oscillations having excursions going beyond saturation than during oscillation at said level below saturation, and a current responsive operator connected for operation by said average D.C. current.

8. An impedance sensitive apparatus comprising an electronic regenerative oscillator, a D.C. supply therefor, a variable impedance device in the form of an electromechanical transducer the magnitude of whose electrical impedance varies between a first magnitude and a second lower magnitude according to its mechanical loading during mechanical vibration, said device having said electrical impedance coupled effectively in series with said oscillator and D.C. supply, said oscillator being tuned to oscillate at substantially any frequency within a frequency band which includes the fundamental mechanical resonance frequency of said transducer, whereby said transducer effectively determines the frequency of oscillation of said oscillator, and means biasing said oscillator to a D.C. operating level below but close to saturation, and therefore the nonlinear portion of its output current vs. control voltage characteristic, which assures oscillation excursions substantially beyond saturation when said impedance has said second magnitude and oscillation excursions entirely at a level below saturation when said impedance has said first magnitude, said oscillations into the saturation region being clipped on positive-going half cycles so that the average D.C. current passed by said oscillator is less during oscillations having excursions going beyond saturation than during oscillation at said level below saturation, and a current responsive operator connected for operation by said average D.C. current.

9. An electronic apparatus for sensing a change in the magnitude of the impedance of an electromechanical sensor having a known fundamental mechanical resonance frequency, comprising, said sensor, a regenerative oscillator tuned to oscillate substantially at said frequency, means effectively connecting said sensor in the D.C. supply circuit of the oscillator, and a relay also connected at the D.C. supply circuit of the oscillator, the oscillator being so biased that oscillation substantially stops when the sensor has high series electrical impedance, and oscillation is sustained when the sensor has low series electrical impedance, means biasing the oscillator so near saturation and therefore the nonlinear portion of its output current vs. control voltage characteristic curve that the output oscillator wave is clipped on positive-going half cycles and the average D.C. current through the oscillator is substantially less during oscillation than during non-oscillation, said change in D.C. current being adapted to operate the relay to one of two mutually exclusive conditions.

References Cited in the file of this patent
UNITED STATES PATENTS

| | | |
|---|---|---|
| 1,789,369 | Meissner | Jan. 20, 1931 |
| 2,523,363 | Gehman | Sept. 26, 1950 |
| 2,664,556 | Sontheimer | Dec. 29, 1953 |
| 2,682,026 | Mesh et al. | June 22, 1954 |
| 2,775,748 | Rod | Dec. 25, 1956 |
| 2,800,647 | Raerwald | July 23, 1957 |
| 2,839,695 | Robey | June 17, 1958 |
| 2,888,945 | Marlow | June 2, 1959 |